United States Patent [19]
Carmody

[11] 3,820,573
[45] June 28, 1974

[54] TUBULAR LAMINATE AND A METHOD OF MAKING A TUBULAR LAMINATE

[75] Inventor: Raymond Francis Carmody, Nassau Bay, Tex.

[73] Assignee: Shakespeare Company, Columbia, S.C.

[22] Filed: June 22, 1971

[21] Appl. No.: 155,522

[52] U.S. Cl.............. 138/141, 138/145, 138/153, 161/176
[51] Int. Cl.............................................. F16l 9/14
[58] Field of Search........... 138/141, 144, 145, 151, 138/153; 156/187, 188, 192, 195; 161/176

[56] References Cited
UNITED STATES PATENTS

| | | | |
|---|---|---|---|
| 2,726,185 | 12/1955 | Howald | 161/176 X |
| 3,002,534 | 10/1961 | Noland | 138/141 |
| 3,429,758 | 2/1969 | Young | 138/144 X |
| 3,574,104 | 4/1971 | Medler | 138/144 X |
| 3,646,610 | 2/1972 | Jackson | 273/80 R |

Primary Examiner—William F. O'Dea
Assistant Examiner—Peter D. Ferguson
Attorney, Agent, or Firm—Kenyon & Kenyon Reilly Carr & Chapin

[57] ABSTRACT

The tubular member is made by forming a layer of chopped glass fibers over the mandrel and thereafter positioning an equal number of filaments in parallel longitudinally over the layer of chopped fibers. After curing, the mandrel can be removed or retained within the laminate. The tubular member thus has a shell formed of longitudinal filaments which extend along the length of the laminate over a core layer of chopped fibers and an overall thickness which varies as desired.

7 Claims, 5 Drawing Figures

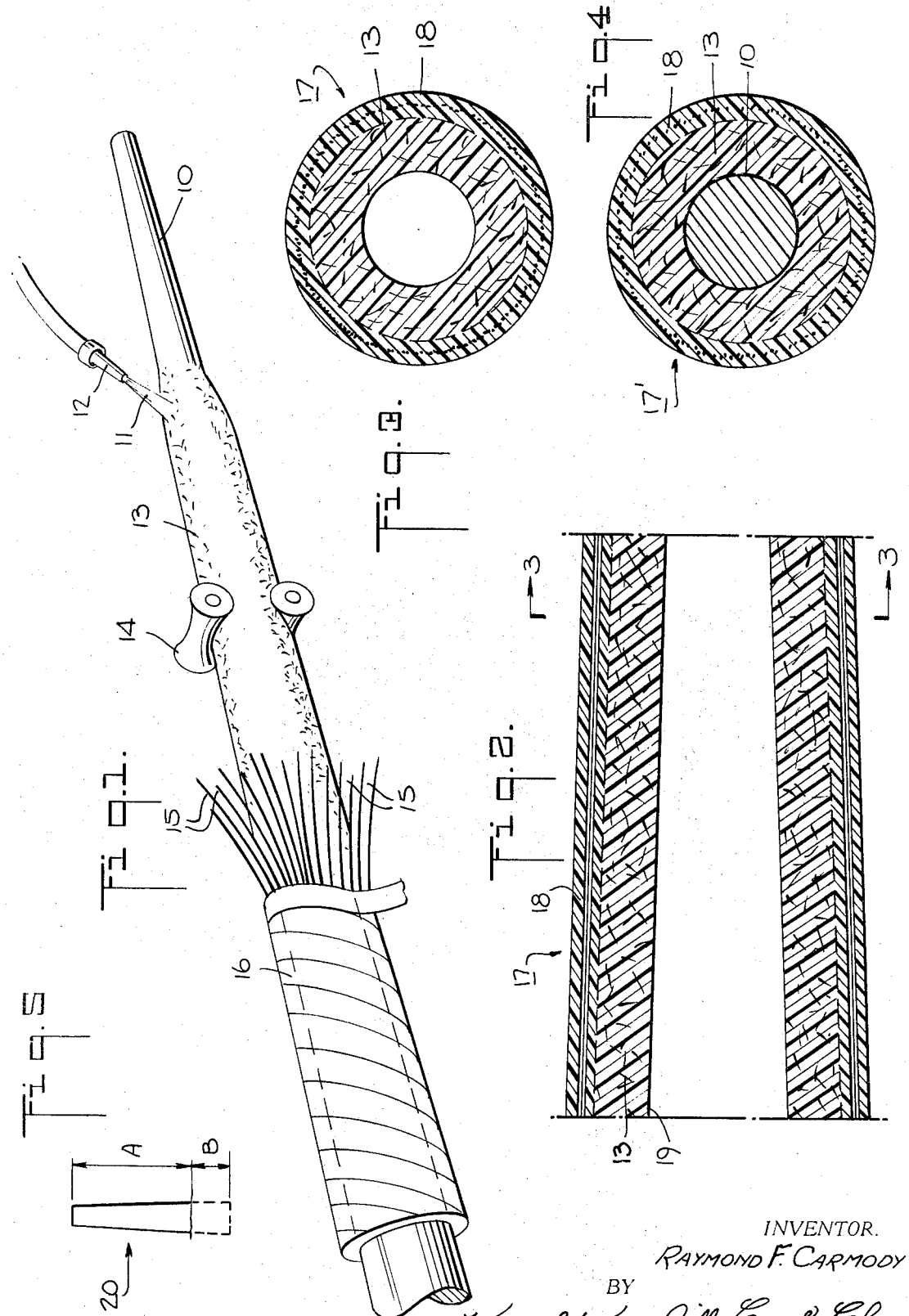

TUBULAR LAMINATE AND A METHOD OF MAKING A TUBULAR LAMINATE

This invention relates to a tubular laminate and a method of making a tubular laminate.

Various methods have been known in the past for producing tubes of synthetic materials such as tubes of resin impregnated glass fiber materials. For example, in the making of high strength hollow tubular laminate shapes, it has been known to first lay up a great many strands of resin impregnated glass fiber rovings or yarn over a suitable mandrel, to thereafter cure the resin and to remove the mandrel to form the structure. Usually, in the case of cylindrical shapes, all of the strands have extended for the full length of the structure. In the case of a tapered tube structure, some of the strands or rovings of yarn have extended the full length of the structure while others have extended only over a part of the length, starting from the larger end of the structure and stopping short of the smaller end. This has been done in order for the wall thickness of the tapered tube to remain constant or to be reduced in the direction of the small end. However, the laying up of these various lengths of roving or yarn about a mandrel is a tedious, time consuming, difficult and expensive task.

Accordingly, it is an object of this invention to provide a method of efficiently and easily constructing tapered laminates of synthetic materials.

It is another object of the invention to provide a tapered tubular laminate of relatively small cost.

It is another object of the invention to provide a method of making a hollow tubular laminate in a relatively short period of time.

It is another object of the invention to provide a method of constructing a tapered hollow tubular laminate in an easy manner.

Briefly, the invention is directed to a method of making a tapered tubular member as well as the tapered tubular laminate made thereby. The method is carried out such that the resultant laminate has an inner core layer of impregnated chopped glass fibers which is surrounded by a thin casing or shell of longitudinally oriented glass fiber filaments impregnated with resin. The number of filaments in the shell are such as to resist the tensile loads imposed on the laminate by a bending force while the thickness of the inner core layer is sufficient to carry the compressive loads imposed by the bending force.

The method includes the steps of placing a layer of impregnated chopped glass fibers or roving around and along a tapered portion of a mandrel, of arranging a plurality of resin impregnated glass fiber filaments of substantially equal length over the layer of chopped glass fibers, and of compacting and curing the resultant mass to form the tubular laminate. The mandrel is then removed so as to provide a hollow tapered tubular laminate. Alternatively, a mandrel of suitable material can be retained within the laminate to form a solid tapered laminate.

In one embodiment of the method, the chopped glass fibers are sprayed onto the mandrel while, in another variation, the chopped glass fibers are embodied in a mat which is wrapped about the mandrel. In either case, the thickness of the chopped fiber layer can be varied longitudinally of the mandrel depending on the construction of the final laminate.

In another embodiment of the method, the layer of chopped glass fibers is compacted before the longitudinal filaments are arranged over the chopped layer. In still another embodiment, the layer of chopped fibers is first compacted and cured into a self-supporting structure and the tapered mandrel removed therefrom. The impregnated filaments are thereafter placed over the resultant structure and cured to complete the laminate.

The laminate made in accordance with the invention includes a tapered portion having an outer shell of longitudinally disposed parallel filaments and an integral inner layer of chopped glass fibers. The number of filaments in the shell is constant and each filament extends throughout the length of the laminate. As a result, the smaller end of the shell has a larger radial thickness than the larger end. In order to form a laminate with a constant thickness, the chopped glass fiber layer is varied in thickness in inverse relation to the shell.

In one embodiment, the laminate has a bore which extends to the smaller end so as to form a hollow tube. In another embodiment, the bore has an internal core contained therein. This core can be provided by the mandrel about which the laminate is initially made. In any event, the core can be made of a metal, plastic, a foam plastic or other suitable material.

In still another embodiment, the laminate is formed with a second tapered portion. This second tapered portion is of less taper than the first tapered portion and extends from the larger end of the first tapered portion. The amount of taper in the second portion is slight enough to permit the mandrel upon which the laminate is made to be removed. In the event that the mandrel is not to be removed, this second portion can be made cylindrical.

The laminates of the invention can be used, for example, as lighting standards, flag poles, power poles and the like. In the case of the laminates with the two tapered portions, the portion of slight taper would be embedded within the ground while the portion of greater taper would extend upwardly from the ground.

These and other objects and advantages of the invention will become more apparent from the following detailed description and appended claims taken in conjunction with the accompanying drawings in which:

FIG. 1 illustrates a perspective view of a manner of making a tubular laminate according to the invention;

FIG. 2 illustrates a cross-sectional view of a tubular laminate made in accordance with the invention;

FIG. 3 illustrates a view taken on line 3—3 of FIG. 2;

FIG. 4 illustrates a view similar to FIG. 3 of another embodiment according to the invention; and FIG. 5 illustrates a view of a tubular laminate of the invention having two tapered portions.

Referring to FIG. 1, in order to make a tubular laminate, a mandrel 10, for example, of steel, having a tapered portion is positioned in a vertical plane, polished and waxed and thereafter provided with a suitable mold release compound as is known. Next, chopped glass fibers 11 are sprayed along with a suitable resin from a spray nozzle 12 connected to a supply source (not shown) over the mandrel 10 so as to provide a substantially uniform layer 13 around and about the mandrel 10. The mixture of fibers and resin is such as to flow through and from the nozzle 12 so as to adhere to the surface of the mandrel 10. Thereafter, the layer 11 of resin impregnated chopped glass fibers is compacted by a suitable means such as grooved rollers 14 placed to achieve a uniform compaction of the layer 11.

After compaction of the chopped glass fiber layer 11 is carried out, a plurality of longitudinal strands of resin impregnated glass fiber filaments 15 are applied over the compacted layer 11 and compacted. The filaments 15 are laid along the chopped glass fiber layer 11 so that the filaments 15 define a greater radial thickness at the smaller end of the mandrel 10 than at the larger end. The cross-sectional area of the filaments 15 thus remains constant throughout the length of the mandrel 10.

After the longitudinal filaments 15 have been placed, a plastic filament tape 16, as is known, is wrapped about the mass of material on the mandrel 10 and thereafter the resin is cured by the application of heat as is known. After curing, the tape 16 is removed and the mandrel 10 withdrawn to produce the finished tapered tubular laminate 17.

Referring to FIG. 2, the tubular laminate 17 which is formed contains an outer shell 18 of longitudinally aligned parallel glass fiber filaments 15 and an inner integral layer 13 of chopped glass fiber filaments. In addition, a tapered bore 19 extends through the laminate 17. The shell 18 is of a thickness which varies in a uniform manner inversely of the taper in the mandrel 10, for a constant thickness of the layer 13 from the larger end of the laminate 17 towards the apex or small end. Alternatively, the layer 13 of chopped glass fibers can be made to vary in a uniform manner so as to decrease or increase in the direction of the apex of the laminate 17 so that the resultant taper of the outside surface of the shell 18 can be increased or decreased, respectively.

Referring to FIG. 4, the mandrel 10 can be retained within the laminate 17' so as to define a core for a solid laminate.

Instead of spraying the chopped glass fibers 11 onto the mandrel 10, a pre-impregnated glass fiber mat can be wrapped about the mandrel 10. Also, the layer 13 of chopped glass fibers 11 and resin can be cured after compaction by the rollers 14. Next, the mandrel 10 can be removed with the layer 11 forming a self-supporting structure and the longitudinal filaments 15 and resin can be applied over the resultant structure. The subsequent steps of wrapping the structure with film or tape 16 and curing can then be carried out. The advantage of this alternative method is that the mandrel 10 can be omitted such that handling of the structures involved is easier. Also, the fabrication operations can be carried out while the structure is in a horizontal position rather than in a more expensive and cumbersome vertical position.

Referring to FIG. 5, the tubular laminate 20 is provided with a first tapered portion A and a second tapered portion B of less taper than the first portion A. This laminate 20 is made in similar fashion as above. That is, with a mandrel formed of two adjacent sections of different tapers, a layer of resin impregnated chopped glass fibers is formed over the two tapered sections of the mandrel and thereafter a number of parallel resin impregnated filaments are laid over the chopped glass fiber layer. Subsequent fabrication steps, as above, are carried out to result in the tubular laminate 20. Alternatively, a mandrel as above with a single tapered section can be used. In this case, the layer of chopped fibers is applied to produce two sections of different tapers so that the parallel filaments take on a similar profile when laid over the layer of chopped fibers.

As a note, the apex end of the laminate can be open so as to form a complete tube or the apex can be closed by a forming over of the glass fibers and filaments.

The tubular laminate which is produced can be used to make tubes of a wide range of sizes. For example, the tubular laminate can be used to make light standards, power poles, flag poles and the like. For example, referring to FIG. 5, the tubular laminate 20 can be of a length of 17 feet with one portion B of 5 foot length embedded in the ground. The remaining 12 feet constitutes the portion A of greater taper and extends above the ground. The outside diameter at the point between the two portions, A, B, i.e., at the 12 foot point, or ground level point, is of 5½ inches with an inside diameter of 4 and 27/32 inches. The apex or tip end of the laminate 20 has an outside diameter of 4-1/16 inch with an inside diameter of 3-5/32 inches. In addition, at ground level, the percentage of parallel longitudinal filaments is 5 percent of the total cross-sectional area of the laminate 20 while at the smaller end the percentage is 19.5 percent. The wall thickness of the chopped glass fiber layer is a uniform 5/16 of an inch. The outer surface of the 5 feet of the laminate which is embedded in the ground is almost cylindrical with only a sufficient taper to facilitate withdrawal of the mandrel used in fabrication. In addition, the cross-sectional area of the parallel longitudinal filaments and resin is 0.792 square inches and there is a uniform number of filaments from one end to the other of the laminate 20.

The invention thus provides a simple and efficient method of making tubular laminates of either hollow or solid construction.

In constructing a particular tubular laminate of the invention, the number of glass fiber filaments required in the shell to resist the maximum bending stress to which the laminate would be subjected for a given diameter is first determined. Thereafter, the thickness of the chopped glass fiber layer is calculated for the pertinent design loads. Thereafter, a fabrication method as described above is performed. In this way, the outer shell is designed to provide for the necessary bending strength of the laminate while the chopped glass fiber layer is designed to provide the necessary compressive strength of the laminate.

The tubular laminates provided by the invention can be formed with various tolerance ranges. For example, for a given diameter, number of filaments and chopped fiber layer thickness, the degree of compaction of the chopped fiber layer can vary to produce a density of glass fibers of from 15 to 60 per cent of the cross-sectional area of the layer. Also, the degree of taper can vary in any suitable manner.

What is claimed is:

1. A tubular laminate having a tapered portion tapering to an apex and including a shell of longitudinally disposed parallel resin impregnated filaments, said shell being of increasing radial thickness in the direction of said apex, and an inner layer of resin impregnated chopped glass fibers integrally formed within said shell, each said filament extending over the entire length of said tapered portion.

2. A tubular laminate as set forth in claim 1 wherein said layer is of uniform radial thickness longitudinally of said tapered portion.

3. A tubular laminate as set forth in claim 1 wherein said layer is of decreasing thickness in the direction of said apex.

4. A tubular laminate as set forth in claim 1 wherein said chopped glass fibers are disposed within a mat.

5. A tubular laminate as set forth in claim 1 which further has a second tapered portion extending from the first tapered portion; said second tapered portion having a smaller degree of taper than said first tapered portion.

6. A tubular laminate as set forth in claim 1 having a central bore extending longitudinally therein.

7. A tubular laminate as set forth in claim 1 wherein the percentage of parallel longitudinal filaments is 5 per cent of the cross-sectional area at a point at the larger end of said tapered portion and 19.5 per cent at the apex of said tapered position.

* * * * *